US012590851B2

(12) United States Patent
Chen et al.

(10) Patent No.: US 12,590,851 B2
(45) Date of Patent: Mar. 31, 2026

(54) FORCE SENSOR

(71) Applicant: PIXART IMAGING INC., Hsin-Chu (TW)

(72) Inventors: Yen-Po Chen, Hsin-Chu (TW); Hao-Che Liu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 342 days.

(21) Appl. No.: 18/395,712

(22) Filed: Dec. 25, 2023

(65) Prior Publication Data

US 2025/0207983 A1 Jun. 26, 2025

(51) Int. Cl.
G01L 1/00 (2006.01)

(52) U.S. Cl.
CPC .................................... G01L 1/005 (2013.01)

(58) Field of Classification Search
CPC . G01L 1/005; G01L 1/26; G01L 1/142; G01L 1/00; G01L 1/04; G01L 5/00
See application file for complete search history.

(56) References Cited

U.S. PATENT DOCUMENTS

| | | | | |
|---|---|---|---|---|
| 5,417,312 A | * | 5/1995 | Tsuchitani | ............ G01P 15/125 |
| | | | | 303/181 |
| 7,719,164 B2 | * | 5/2010 | Gologanu | ............ H10N 30/098 |
| | | | | 310/309 |
| 2019/0368951 A1 | * | 12/2019 | Tseng | ...................... G01L 1/142 |

* cited by examiner

*Primary Examiner* — Tarun Sinha
(74) *Attorney, Agent, or Firm* — Li & Cai Intellectual Property Office

(57) ABSTRACT

A force sensor includes two sheets facing each other, two electrode layers respectively installed on inner sides of the two sheets an insulating elastomer sandwiched between the two electrode layers, a bumper disposed on one of the two sheets, and a bonding layer that connects the two sheets and that is arranged outside of the insulating elastomer. The bumper includes a base body and a bumper that is connected to and protrudes from the base body. When the force sensor receives an external force through the protruding body of the bumper, at least one of the two sheets is pressed by the base body to have an elastic deformation, so that the insulating elastomer is elastically deformed, and the bonding layer is elastically deformed.

20 Claims, 7 Drawing Sheets

100

FORCE SENSOR

FIELD OF THE DISCLOSURE

The present disclosure relates to a sensor, and more particularly to a force sensor.

BACKGROUND OF THE DISCLOSURE

Since the technology behind a conventional force sensor has matured over time, rarely has the structural configuration of the conventional force sensor been studied and improved in recent years. Accordingly, opportunities for the accuracy of the conventional force sensor to be effectively improved are few and far between.

SUMMARY OF THE DISCLOSURE

In response to the above-referenced technical inadequacies, the present disclosure provides a force sensor for effectively improving on the issues associated with conventional force sensors.

In order to solve the above-mentioned problems, one of the technical aspects adopted by the present disclosure is to provide a force sensor, which includes a first sheet, a second sheet, two electrode layers, an insulating elastomer, a bumper, and a bonding layer. The first sheet has a first inner surface and a first outer surface that is opposite to the first inner surface. The second sheet has a second inner surface and a second outer surface that is opposite to the second inner surface. The second inner surface is spaced apart from and faces toward the first inner surface along a thickness direction. The two electrode layers are respectively installed on the first inner surface and the second inner surface. The insulating elastomer is sandwiched between the two electrode layers. The bumper includes a base body and a protruding body. The base body is fixed to the second outer surface of the second sheet through a bottom side thereof. The protruding body protrudes from the base body. Moreover, a projection space defined by projecting the bumper toward the first sheet along the thickness direction covers at least part of the insulating elastomer. The bonding layer is connected in-between the first inner surface of the first sheet and the second inner surface of the second sheet and is located outside of the insulating elastomer. When the force sensor receives an external force through the protruding body of the bumper, the second sheet is pressed by the base body to have an elastic deformation, so that the insulating elastomer is elastically deformed, and the bonding layer is elastically deformed.

In certain embodiments, the first sheet, the second sheet, and the bonding layer jointly define a deformable space that is not sealed and that is in spatial communication with an external space.

In certain embodiments, the protruding body is connected to a center portion of the base body.

In certain embodiments, a height of the protruding body along the thickness direction is greater than or equal to a thickness of the base body.

In certain embodiments, along a transverse direction perpendicular to the thickness direction, the bumper has a first outside diameter, and the protruding body has a second outside diameter that is within a range from 15% to 25% of the first outside diameter.

In certain embodiments, the insulating elastomer includes an insulating layer and a plurality of pillars. The insulating layer is disposed on one of the two electrode layers. Each of the pillars has a first end and a second end that is opposite to the first end. The first ends of the pillars are connected to the insulation layer, and the second ends of the pillars are connected to another one of the two electrode layers. The projection space covers an entirety of the pillars.

In certain embodiments, along a transverse direction perpendicular to the thickness direction, the bumper has a first outside diameter, and two of the pillars arranged away from each other have a largest distance therebetween that is within a range from 95% to 105% of the first outside diameter.

In certain embodiments, the force sensor further includes an adhesive layer disposed on the first outer surface and configured to adhere to an external object.

In certain embodiments, the first sheet includes a first substrate and a first grounding layer. The first substrate has the first inner surface. The first grounding layer is disposed on the first substrate and has the first outer surface. Moreover, a first projection region defined by projecting the two electrode layers and the insulating elastomer onto the first sheet along the thickness direction is entirely located on the first grounding layer.

In certain embodiments, the second sheet includes a second substrate and a second grounding layer. The second substrate has the second inner surface. The second grounding layer is disposed on the second substrate and having the second outer surface. The base body of the bumper is adhered to the second grounding layer. Moreover, a second projection region defined by projecting the two electrode layers and the insulating elastomer onto the second sheet along the thickness direction is entirely located on the second grounding layer.

In certain embodiments, a hardness of the bonding layer meets a Shore A hardness of 0-100 and a Shore OOOS hardness of 0-100.

In certain embodiments, the projection space covers at least 50% of a volume of the insulating elastomer.

In order to solve the above-mentioned problems, another one of the technical aspects adopted by the present disclosure is to provide a force sensor, which includes a first sheet, a second sheet, two electrode layers, an insulating elastomer, a bumper, and a bonding layer. The first sheet has a first inner surface and a first outer surface that is opposite to the first inner surface. The second sheet has a second inner surface and a second outer surface that is opposite to the second inner surface. The second inner surface is spaced apart from and faces toward the first inner surface along a thickness direction. The two electrode layers are respectively installed on the first inner surface and the second inner surface. The insulating elastomer is sandwiched between the two electrode layers. The bumper includes a base body and a protruding body. The base body is fixed to the second outer surface of the second sheet through a bottom side thereof. The protruding body protrudes from the base body. Moreover, a projection space defined by projecting the bumper toward the first sheet along the thickness direction covers at least part of the insulating elastomer. The bonding layer is located outside of the insulating elastomer and includes a supporting body, a first bonding film connected to one side of the supporting body, and a second bonding film that is connected to another side of the supporting body. The supporting body is connected to the first inner surface of the first sheet through the first bonding film, and the supporting body is connected to the second inner surface of the second sheet through the second bonding film. When the force sensor receives an external force through the protruding body of the bumper, the second sheet is pressed by the base body to have an elastic deformation, so that the insulating elastomer is elastically deformed, and at least one of the first bonding film and the second bonding film is elastically deformed.

In certain embodiments, the at least one of the first bonding film and the second bonding film has a hardness that meets a Shore A hardness of 0-100 and a Shore OOOS hardness of 0-100.

In certain embodiments, along the thickness direction, a thickness of the supporting body is within a range from 40% to 80% of a thickness of the bonding layer. The hardness of each of the first bonding film and the second bonding film meets the Shore A hardness of 0-100 and the Shore OOOS hardness of 0-100.

In certain embodiments, the first sheet, the second sheet, and the bonding layer jointly define a deformable space that is not sealed and that is in spatial communication with an external space.

In certain embodiments, the protruding body is connected to a center portion of the base body. Moreover, a height of the protruding body along the thickness direction is greater than or equal to a thickness of the base body.

In certain embodiments, along a transverse direction perpendicular to the thickness direction, the bumper has a first outside diameter, and the protruding body has a second outside diameter that is within a range from 15% to 25% of the first outside diameter.

In certain embodiments, the insulating elastomer includes an insulating layer disposed on one of the two electrode layers and a plurality of pillars each having a first end and a second end that is opposite to the first end. The first ends of the pillars are connected to the insulation layer, and the second ends of the pillars are connected to another one of the two electrode layers. The projection space covers an entirety of the pillars.

In certain embodiments, along a transverse direction perpendicular to the thickness direction, the bumper has a first outside diameter, and two of the pillars arranged away from each other have a largest distance therebetween that is within a range from 95% to 105% of the first outside diameter.

In certain embodiments, the force sensor further includes an adhesive layer disposed on the first outer surface and configured to adhere to an external object.

In certain embodiments, the first sheet includes a first substrate having the first inner surface and a first grounding layer disposed on the first substrate and having the first outer surface. Moreover, a first projection region defined by projecting the two electrode layers and the insulating elastomer onto the first sheet along the thickness direction is entirely located on the first grounding layer.

In certain embodiments, the second sheet includes a second substrate having the second inner surface and a second grounding layer that is disposed on the second substrate and that has the second outer surface. The base body of the bumper is adhered to the second grounding layer. Moreover, a second projection region defined by projecting the two electrode layers and the insulating elastomer onto the second sheet along the thickness direction is entirely located on the second grounding layer.

In certain embodiments, the projection space covers at least 50% of a volume of the insulating elastomer.

Therefore, the bumper of the force sensor provided by the present disclosure has the protruding body and is in structural cooperation with other components, so that the force sensor can be easily used to accurately receive the external force through the protruding body, and the bonding layer (or at least one of the first bonding film and the second bonding film) is elastically deformed, thereby enabling the insulating elastomer to entirely absorb the external force from the bumper and effectively increasing the accuracy of the force sensor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
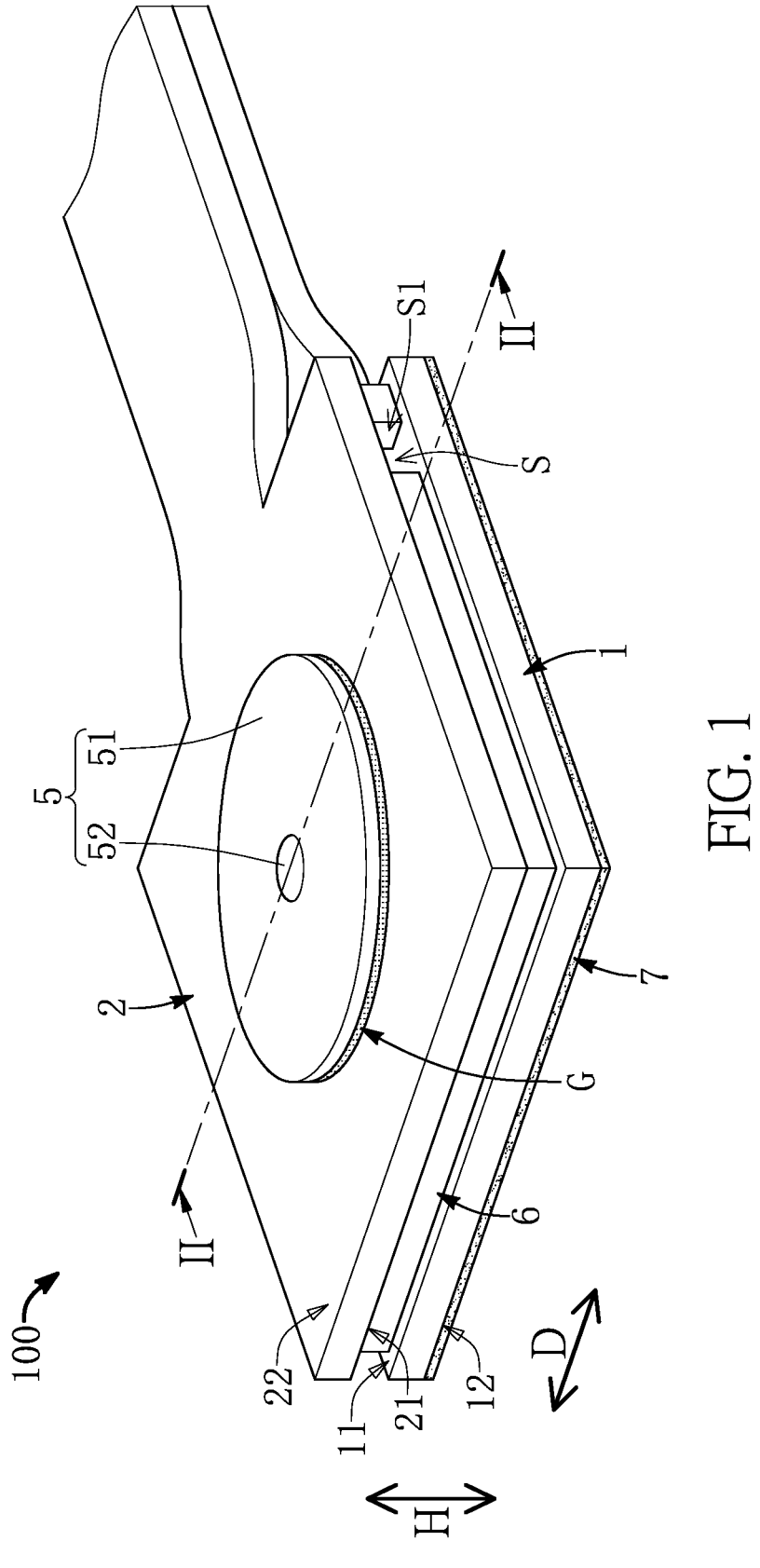
FIG. 1 is a schematic perspective view of a force sensor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
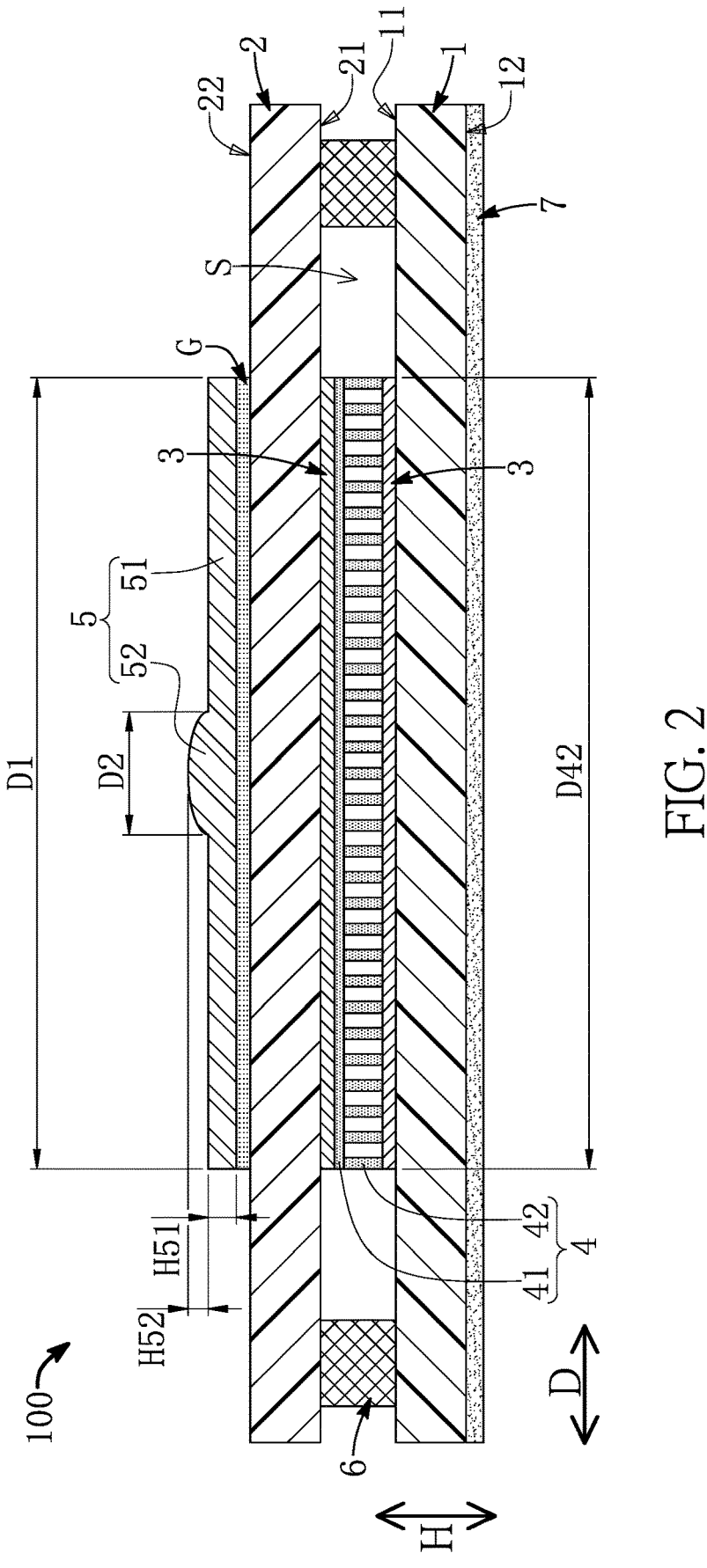
FIG. 2 is a schematic cross-sectional view taken along line VII-VII of FIG. 1.
Figure 3:
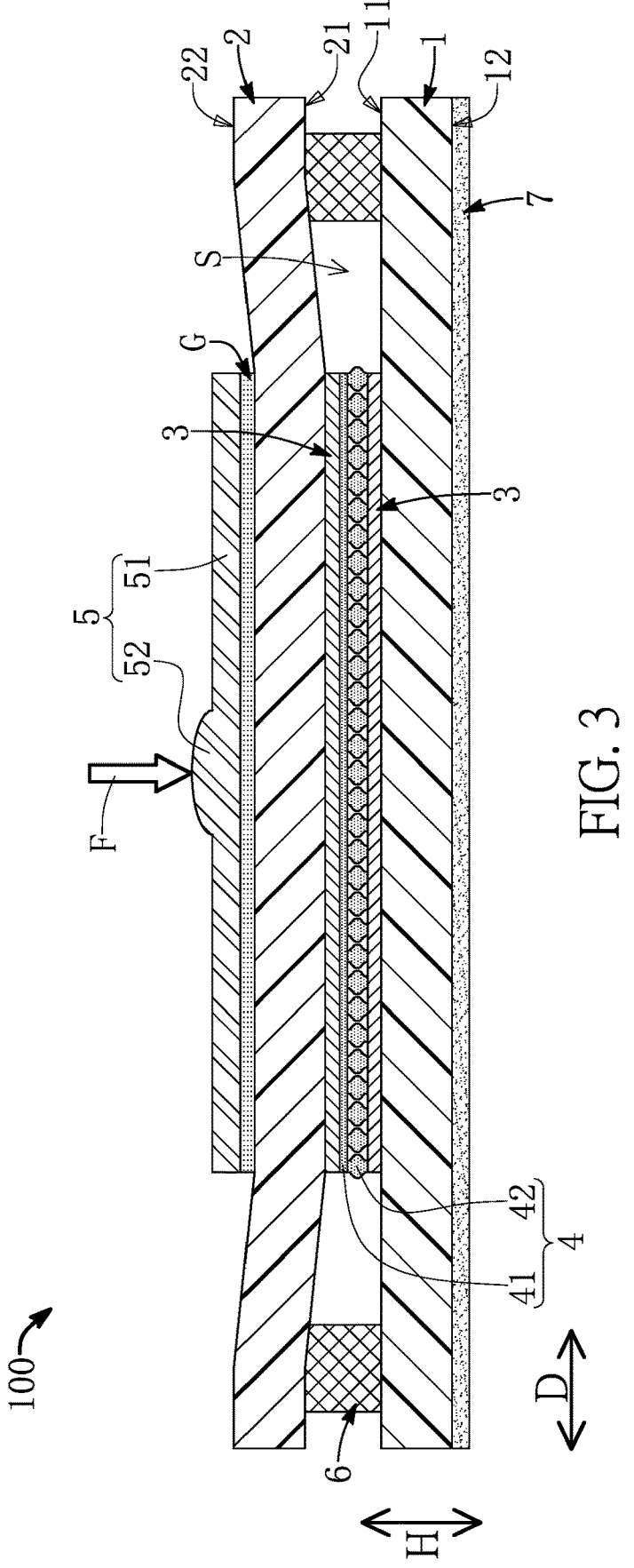
FIG. 3 is a schematic cross-sectional view showing the force sensor of FIG. 2 receiving an external force.

Referring to FIG. 1 to FIG. 3, a first embodiment of the present disclosure provides a force sensor 100. The force sensor 100 in the present embodiment includes a first sheet 1, a second sheet 2 spaced apart from the first sheet 1, two electrode layers 3 respectively installed on the first sheet 1 and the second sheet 2, an insulating elastomer 4 sandwiched between the two electrode layers 3, a bumper 5 disposed on the second sheet 2, a bonding layer 6 connected in-between the first sheet 1 and the second sheet 2, and an adhesive layer 7 that is disposed on the first sheet 1, but the present disclosure is not limited thereto. Specifically, the bumper 5 is located at one side of the second sheet 2 away from the two electrode layers 3, and the adhesive layer 7 is located at one side of the first sheet 1 away from the two electrode layers 3.

Each of the first sheet 1 and the second sheet 2 in the present embodiment is flat, the first sheet 1 and the second sheet 2 are flexible structures having a same shape, and outer contours of the first sheet 1 and the second sheet 2 are flush with each other, but the present disclosure is not limited thereto. For example, in other embodiments of the present disclosure not shown in the drawings, the shapes of the first sheet 1 and the second sheet 2 can be different from each other; or, the second sheet 2 is flexible, and the first sheet 1 is not flexible; or, a part of any one of the first sheet 1 and the second sheet 2 arranged adjacent to the two electrode layers 3 needs to be flat, but the other part of any one of the first sheet 1 and the second sheet 2 can be not flat.

In the present embodiment, the first sheet 1 has a first inner surface 11 and a first outer surface 12 that is opposite to the first inner surface 11, and the second sheet 2 has a second inner surface 21 and a second outer surface 22 that is opposite to the second inner surface 21. The second inner surface 21 is spaced apart from and faces toward the first inner surface 11 along a thickness direction H, and an edge of the second inner surface 21 is preferably flush with an edge of the first inner surface 11 along the thickness direction H.

The two electrode layers 3 are respectively installed on the first inner surface 11 of the first sheet 1 and the second inner surface 21 of the second sheet 2, and preferably installed on the center portions of the first inner surface 11 and the second inner surface 21 respectively. In the present embodiment, the two electrode layers 3 have a same shape, and outer contours of the two electrode layers 3 are flush with each other along the thickness direction H, but the present disclosure is not limited thereto.

Moreover, the insulating elastomer 4 is sandwiched between the two electrode layers 3 along the thickness direction H, and an outer contour of the insulating elastomer 4 is preferably arranged adjacent to the outer contours of the two electrode layers 3, but the specific structure of the insulating elastomer 4 can be changed or adjusted according to design requirements. In order to clearly describe the operation of the force sensor 100 provide by the present embodiment, the following description describes the insulating elastomer 4 of a preferable structure, but the present disclosure is not limited thereto.

Specifically, the insulating elastomer 4 includes an insulating layer 41 and a plurality of pillars 42 that are connected to the insulating layer 41. The insulating layer 41 is disposed on one of the two electrode layers 3 (e.g., the electrode layer

4 installed on the first sheet 1), one end of each of the pillars 42 is connected to the insulating layer 41, and another end of each of the pillars 42 is connected to another one of the two electrode layers 3 (e.g., the electrode layer 4 installed on the second sheet 2).

The bumper 5 in the present embodiment is made of a rigid material (e.g., metal or hard plastic) that is not easily deformed. For example, when the bumper 5 and the second sheet 2 are under the same pressure (or force), a deformed level of the bumper 5 is lower than a deformed level of the sheet 2. The bumper 5 includes a base body 51 and a protruding body 52 that is connected to the base body 51. The base body 51 is flat and can have a circular shape. The base body 51 is fixed to the second outer surface 22 of the second sheet 2 through a bottom side thereof (e.g., the bottom side of the base body 51 is adhered onto the second outer surface 22 through an glue layer G). Moreover, the protruding body 52 protrudes from the base body 51 and is preferably connected to a center portion of the base body 51, and a height H52 of the protruding body 52 along the thickness direction H is greater than or equal to a thickness H51 of the base body 51, but the present disclosure is not limited thereto. In addition, a part of the second outer surface 22 connected to the bumper 5 has an area that is less than a predetermined percentage (e.g., 25%) of an area of the second outer surface 22.

Specifically, along a transverse direction D perpendicular to the thickness direction H, the bumper 5 (or the sheer-like body 51) has a first outside diameter D1, and the protruding body 52 has a second outside diameter D2 that is within a range from 15% to 25% of the first outside diameter D1. Moreover, two of the pillars 42 arranged away from each other have a largest distance D42 (shown in FIG. 2) therebetween that is within a range from 95% to 105% of the first outside diameter D1, but the present disclosure is not limited thereto. It should be noted that the transverse direction D in the drawings is shown as a single direction, but the transverse direction D provided by the present embodiment can be any direction perpendicular to the thickness direction H.

It should be noted that the structure of the bumper 5 can be adjusted or changed according to design requirements and is not limited to the present embodiment. For example, in other embodiments of the present disclosure, the bumper 5 is a frustum (e.g., a lower half part of the bumper 5 is the base body 51, and an upper half part of the bumper 5 is the protruding body 52), a surrounding lateral surface of the bumper 5 are a slanting surface, and a cross section of the bumper 5 perpendicular to the thickness direction H gradually decreases in a direction from the base body 51 toward the protruding body 52; or, the base body 51 is flat, the protruding body 52 is connected to a center part of the base body 51, and an area of the center part of the base body 51 is less than a predetermined percentage (e.g., 25%) of an area of the base body 51.

In addition, a projection space defined by orthogonal projecting the bumper 5 toward the first sheet 1 along the thickness direction H covers at least part (e.g., at least 50% of a volume) of the insulating elastomer 4. In the present embodiment, the projection space preferably covers an entirety of the insulating elastomer 4 (e.g., the insulating layer 41 and the pillars 42). In other words, all of the pillars 42 can be uniformly distributed in the projection space and are located in the projection space so as to entirely absorb a force received by the bumper 5, thereby increasing a sensitivity of the force sensor 100.

It should be noted that the bumper 5 in the present embodiment is integrally formed as a single one-piece structure (e.g., the protruding body 52 can be formed by punching the base body 51), but the present disclosure is not limited thereto. For example, in other embodiments of the present disclosure not shown in the drawings, the protruding body 52 can be connected to the base body 51 in other manners (e.g., an adhering manner, a soldering manner, or an engaging manner).

The bonding layer 6 connects the first inner surface 11 of the first sheet 1 and the second inner surface 21 of the second sheet 2, and is arranged outside of (or surrounds) the insulating elastomer 4. Specifically, the arrangement of the bonding layer 6 needs to be sufficient to support the first sheet 1 and the second sheet 2 for maintaining the first sheet 1 and the second sheet 2 to be spaced apart from each other. The bonding layer 6 is made of a material (e.g., a pressure sensitive adhesive, PSA) that is elastically deformable. For example, a hardness of the bonding layer 6 in the present embodiment meets a Shore A hardness of 0-100 and a Shore OOOS hardness of 0-100, but the present disclosure is not limited thereto. Moreover, in the present embodiment, the hardness of the bonding layer 6 is less than that of the second sheet 2, and the hardness of the second sheet 2 is less than or equal to the bumper 5.

Moreover, the first sheet 1, the second sheet 2, and the bonding layer 6 jointly define a deformable space S that is not sealed and that is in spatial communication with an external space through at least one opening S1. Specifically, through the at least one opening S1, the force sensor 100 can be provided for preventing the deformable space S from being an enclosed space that would result a wrong transmission of pressure value due to the interior pressure thereof. Accordingly, when the force sensor 100 receives an external force F through the protruding body 52 of the bumper 5, the second sheet 2 is pressed by the base body 51 to have an elastic deformation, so that the insulating elastomer 4 is elastically deformed, and the bonding layer 6 is elastically deformed.

In summary, the bumper 5 of the force sensor 100 provided by the present embodiment has the protruding body 52 and is in structural cooperation with other components, so that the force sensor 100 can be easily used to accurately receive the external force F through the protruding body 52, and the bonding layer 6 is elastically deformed, thereby enabling the insulating elastomer 4 to entirely absorb the external force F from the bumper 5 and effectively increasing the accuracy of the force sensor 100.

In addition, for facilitating the use of the force sensor 100, the adhesive layer 7 is disposed (or fixed) on the first outer surface 12 of the first sheet 1 and is configured to adhere to an external object (not shown in the drawings), but the present disclosure is not limited thereto.

Second Embodiment

Figure 4:
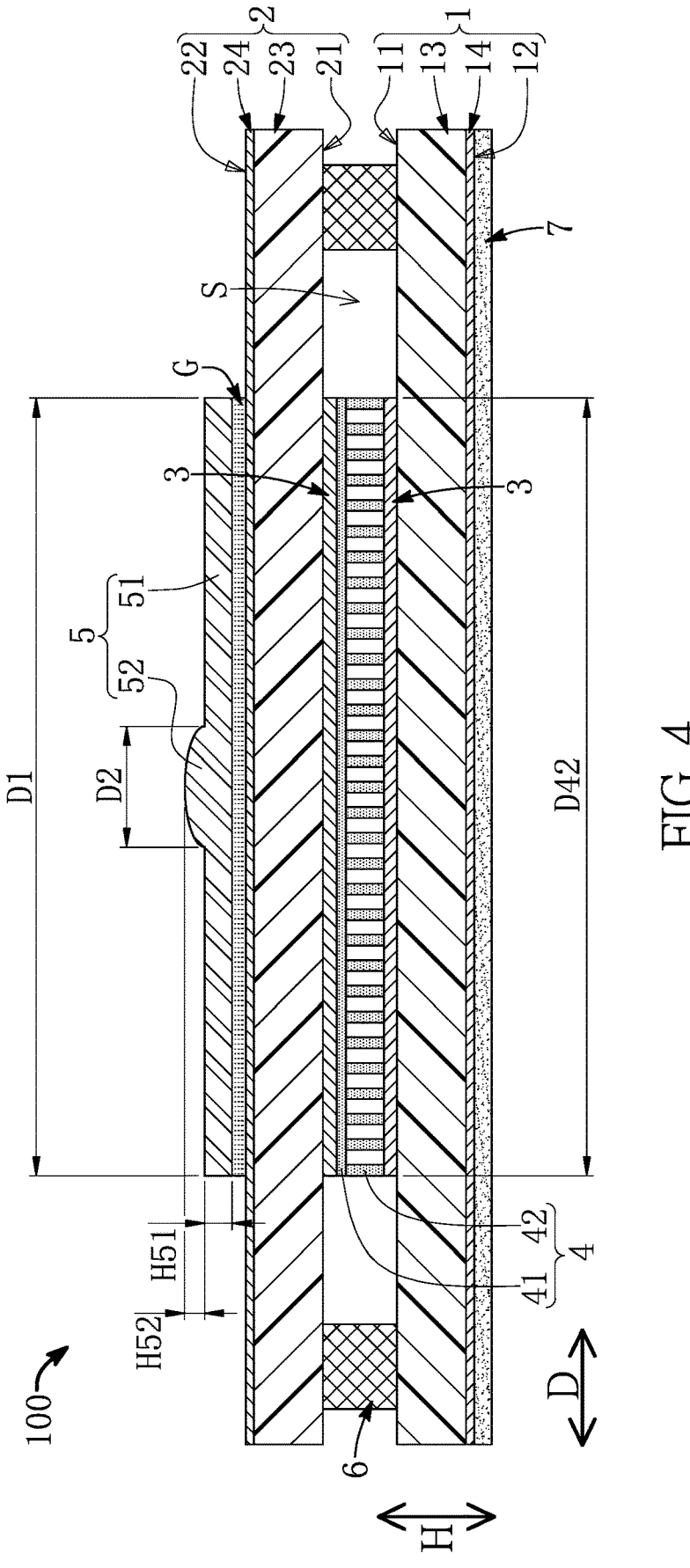
FIG. 4 is a schematic cross-sectional view of the force sensor according to a second embodiment of the present disclosure.

Referring to FIG. 4, a second embodiment of the present disclosure, which is similar to the first embodiment of the present disclosure, is provided. For the sake of brevity, descriptions of the same components in the first and second embodiments of the present disclosure (e.g., the two electrode layers 3, the insulating elastomer 4, the bumper 5, the bonding layer 6, and the adhesive layer 7) will be omitted herein, and the following description only discloses different features between the first and second embodiments.

In the present embodiment, the first sheet 1 includes a first substrate 13 and a first grounding layer 14 that is disposed on the first substrate 13. The first substrate 13 has the first inner surface 11 of the first sheet 1, the first grounding layer 14 has the first outer surface 12 of the first sheet 1, and the adhesive layer 7 is disposed on the first grounding layer 14. Moreover, a first projection region defined by orthogonally projecting the two electrode layers 3 and the insulating elastomer 4 onto the first sheet 1 along the thickness direction H is entirely located on the first grounding layer 14.

The second sheet 2 includes a second substrate 23 and a second grounding layer 24 that is disposed on the second substrate 23. The second substrate 23 has the second inner surface 21 of the second sheet 2, the second grounding layer 24 has the second outer surface 22 of the second sheet 2, and the bumper 5 is disposed on (or adhered to) the second grounding layer 24 through the base body 51. Moreover, a second projection region defined by orthogonally projecting the two electrode layers 3 and the insulating elastomer 4 onto the second sheet 2 along the thickness direction H is entirely located on the second grounding layer 24.

Accordingly, the two electrode layers 3 of the force sensor 100 provided by the present embodiment can be operated to effectively avoid an external interference through the arrangement of the first grounding layer 14 and the second grounding layer 24, thereby effectively increasing the accuracy of the force sensor 100. Furthermore, in other embodiments of the present disclosure not shown in the drawings, the force sensor 100 can be provided with one of the first grounding layer 14 and the second grounding layer 24.

Third Embodiment

Figure 5:
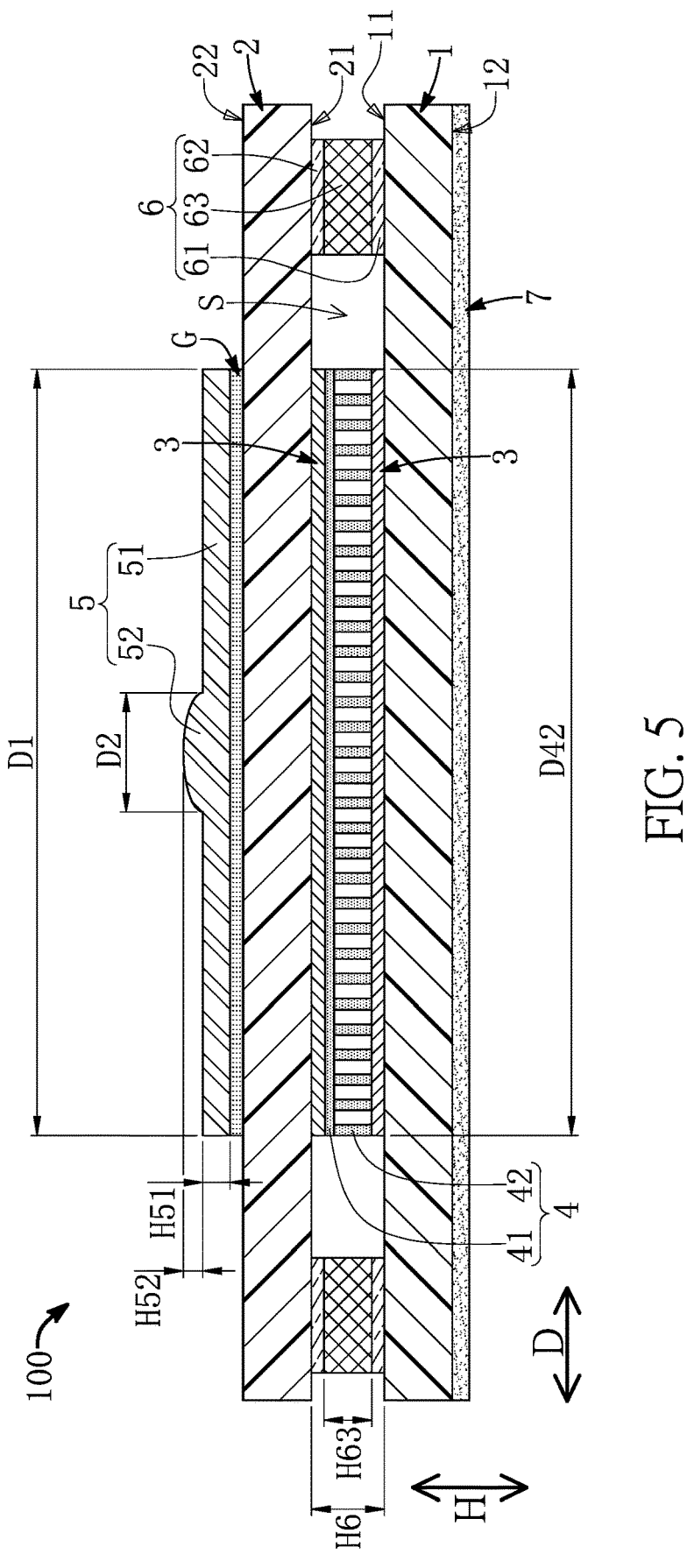
FIG. 5 is a schematic cross-sectional view of the force sensor according to a third embodiment of the present disclosure.
Figure 6:
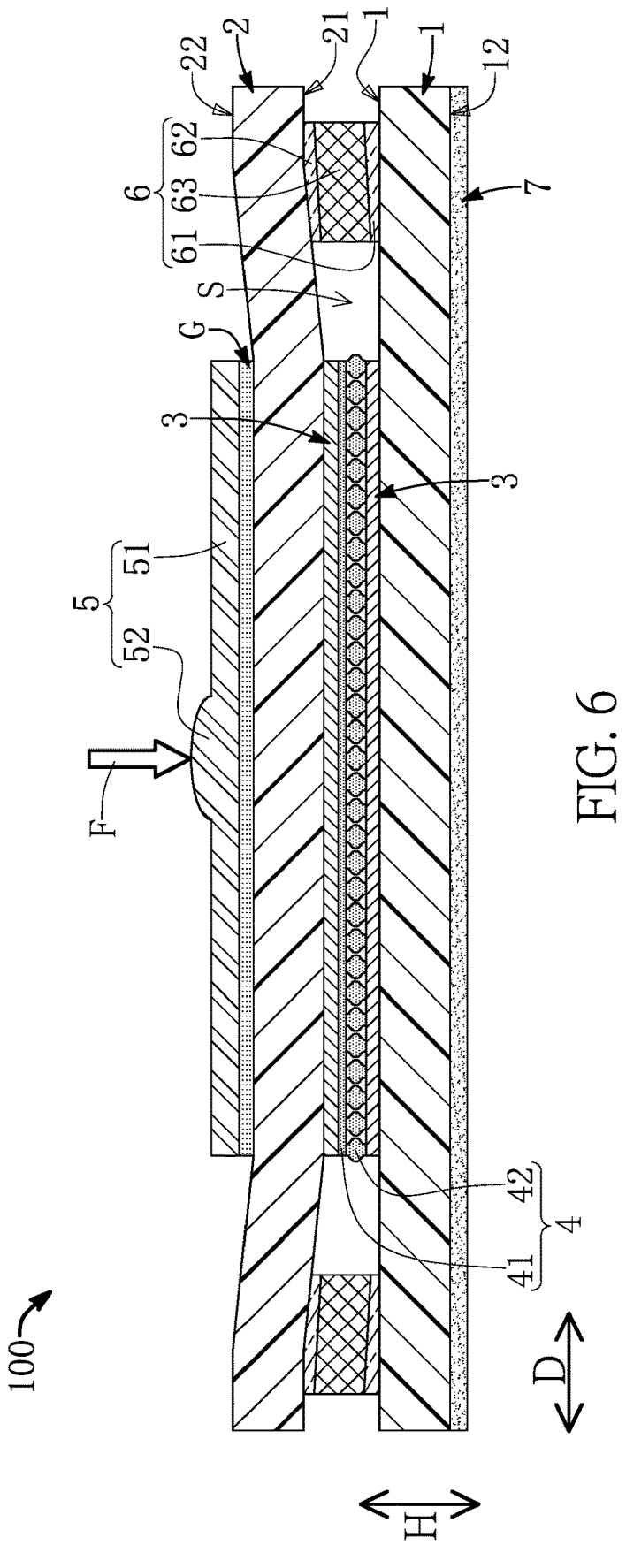
FIG. 6 is a schematic cross-sectional view showing the force sensor of FIG. 5 receiving the external force.
Figure 7:
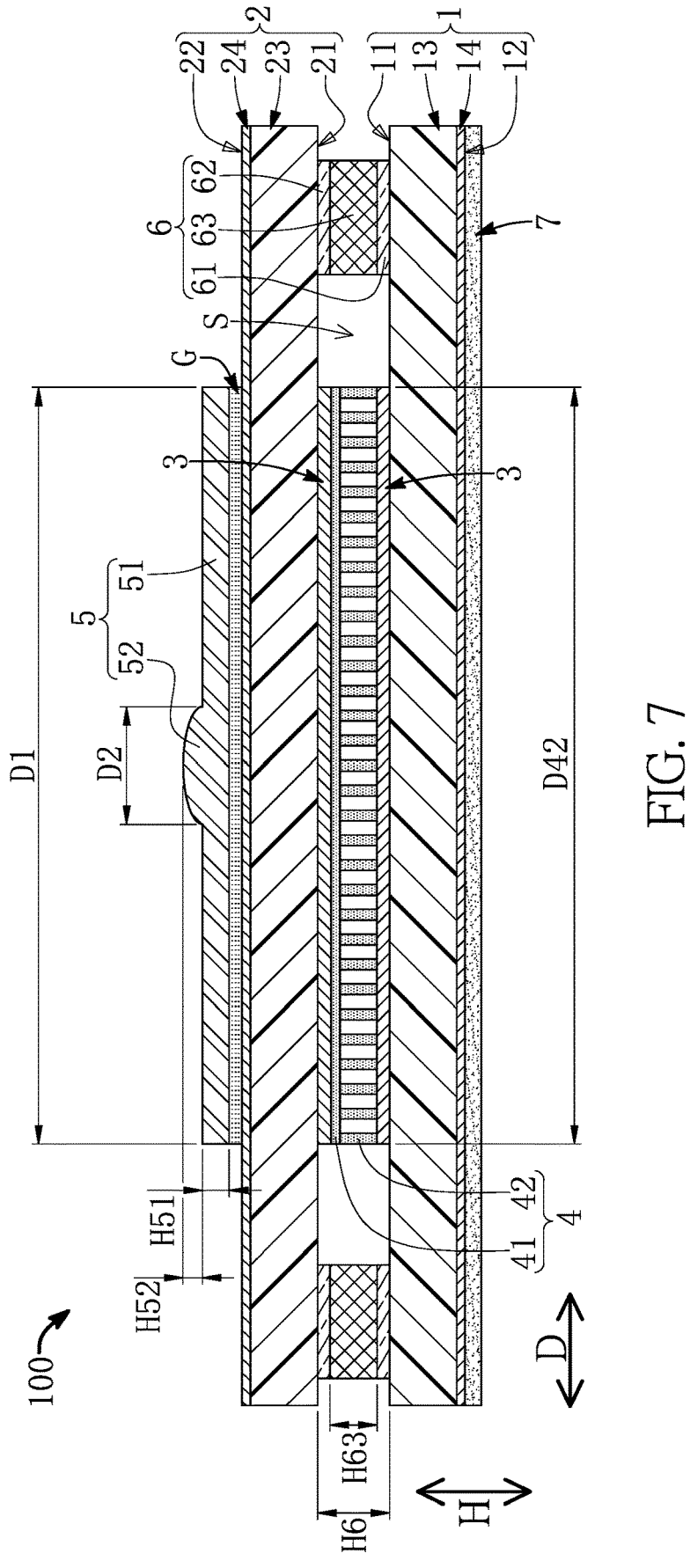
FIG. 7 is a schematic cross-sectional view of the force sensor in another configuration according to the third embodiment of the present disclosure.

Referring to FIG. 5 to FIG. 7, a third embodiment of the present disclosure, which is similar to the first and second embodiments of the present disclosure, is provided. For the sake of brevity, descriptions of the same components in the first to third embodiments of the present disclosure (e.g., the first sheet 1, the second sheet 2, the two electrode layers 3, the insulating elastomer 4, the bumper 5, and the adhesive layer 7) will be omitted herein, and the following description only discloses different features among the first to third embodiments.

In the present embodiment, the bonding layer 6 connects the first inner surface 11 of the first sheet 1 and the second inner surface 21 of the second sheet 2, and is arranged outside of (or surrounds) the insulating elastomer 4. Specifically, the arrangement of the bonding layer 6 needs to be sufficient to support the first sheet 1 and the second sheet 2 for maintaining the first sheet 1 and the second sheet 2 to be spaced apart from each other. The bonding layer 6 includes a supporting body 63, a first bonding film 61, and a second bonding film 62, the latter two of which are respectively connected to two opposite sides of the supporting body 63.

Specifically, the supporting body 63 in the present embodiment is made of a hard material (e.g., metal or hard plastic) that is not easily deformed. Along the thickness direction H, a thickness H63 of the supporting body 63 is within a range from 40% to 80% of a thickness H6 of the bonding layer 6 (e.g., the thickness H63 of the supporting body 63 is preferably greater than a thickness of the first bonding film 61, and is also greater than a thickness of the second bonding film 62), but the present disclosure is not limited thereto.

Moreover, each of the first bonding film 61 and the second bonding film 62 in the present embodiment is made of a material (e.g., a pressure sensitive adhesive, PSA) that is elastically deformable. For example, a hardness of each of the first bonding film 61 and the second bonding film 62 in the present embodiment meets a Shore A hardness of 0-100 and a Shore OOOS hardness of 0-100, but the present disclosure is not limited thereto. However, according to design requirements, one of the first bonding film 61 and the second bonding film 62 can be chosen to be made of the material that is elastically deformable. In other words, at least one of the first bonding film 61 and the second bonding film 62 has the hardness that meets the Shore A hardness of 0-100 and the Shore OOOS hardness of 0-100.

Specifically, the supporting body 63 is connected to the first inner surface 11 of the first sheet 1 through the first bonding film 61, and the supporting body 63 is connected to the second inner surface 21 of the second sheet 2 through the second bonding film 62. Furthermore, the first sheet 1, the second sheet 2, and the bonding layer 6 jointly define a deformable space S that is not sealed and that is in spatial communication with an external space.

Accordingly, when the force sensor 100 provided by the present embodiment receives an external force F through the protruding body 52 of the bumper 5, the second sheet 2 is pressed by the base body 51 to have an elastic deformation, so that the insulating elastomer 4 is elastically deformed, and at least one of the first bonding film 61 and the second bonding film 62 is elastically deformed.

BENEFICIAL EFFECTS OF THE EMBODIMENTS

In conclusion, the bumper of the force sensor provided by the present disclosure has the protruding body and is in structural cooperation with other components, so that the force sensor can be easily used to accurately receive the external force through the protruding body, and the bonding layer (or at least one of the first bonding film and the second bonding film) is elastically deformed, thereby enabling the insulating elastomer to entirely absorb the external force from the bumper and effectively increasing the accuracy of the force sensor.

Moreover, the two electrode layers of the force sensor provided by the present disclosure can be operated to effectively avoid an external interference through the arrangement of the first grounding layer and/or the second grounding layer, thereby effectively increasing the accuracy of the force sensor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A force sensor, comprising:
   a first sheet having a first inner surface and a first outer surface that is opposite to the first inner surface;
   a second sheet having a second inner surface and a second outer surface that is opposite to the second inner surface, wherein the second inner surface is spaced apart from and faces toward the first inner surface along a thickness direction;
   two electrode layers respectively installed on the first inner surface and the second inner surface;
   an insulating elastomer sandwiched between the two electrode layers;
   a bumper including:
      a base body fixed to the second outer surface of the second sheet through a bottom side thereof; and
      a protruding body protruding from the base body, wherein a projection space defined by projecting the bumper toward the first sheet along the thickness direction covers at least part of the insulating elastomer; and
   a bonding layer connected in-between the first inner surface of the first sheet and the second inner surface of the second sheet and located outside of the insulating elastomer;
   wherein, when the force sensor receives an external force through the protruding body of the bumper, the second sheet is pressed by the base body to have an elastic deformation, so that the insulating elastomer is elastically deformed, and the bonding layer is elastically deformed.

2. The force sensor according to claim 1, wherein the first sheet, the second sheet, and the bonding layer jointly define a deformable space that is not sealed and that is in spatial communication with an external space.

3. The force sensor according to claim 1, wherein the protruding body is connected to a center portion of the base body, and a height of the protruding body along the thickness direction is greater than or equal to a thickness of the base body.

4. The force sensor according to claim 1, wherein, along a transverse direction perpendicular to the thickness direction, the bumper has a first outside diameter, and the protruding body has a second outside diameter that is within a range from 15% to 25% of the first outside diameter.

5. The force sensor according to claim 1, wherein the insulating elastomer includes:
   an insulating layer disposed on one of the two electrode layers; and
   a plurality of pillars each having a first end and a second end that is opposite to the first end, wherein the first ends of the pillars are connected to the insulation layer, and the second ends of the pillars are connected to another one of the two electrode layers, and wherein the projection space covers an entirety of the pillars.

6. The force sensor according to claim 5, wherein, along a transverse direction perpendicular to the thickness direction, the bumper has a first outside diameter, and two of the pillars arranged away from each other have a largest distance therebetween that is within a range from 95% to 105% of the first outside diameter.

7. The force sensor according to claim 1, wherein the first sheet includes:
   a first substrate having the first inner surface; and
   a first grounding layer disposed on the first substrate and having the first outer surface;
   wherein a first projection region defined by projecting the two electrode layers and the insulating elastomer onto the first sheet along the thickness direction is entirely located on the first grounding layer.

8. The force sensor according to claim 7, wherein the second sheet includes:
   a second substrate having the second inner surface; and a second grounding layer disposed on the second substrate and having the second outer surface, wherein the base body of the bumper is adhered to the second grounding layer;

wherein a second projection region defined by projecting the two electrode layers and the insulating elastomer onto the second sheet along the thickness direction is entirely located on the second grounding layer.

9. The force sensor according to claim 1, wherein the projection space covers at least 50% of a volume of the insulating elastomer.

10. A force sensor, comprising:

a first sheet having a first inner surface and a first outer surface that is opposite to the first inner surface;

a second sheet having a second inner surface and a second outer surface that is opposite to the second inner surface, wherein the second inner surface is spaced apart from and faces toward the first inner surface along a thickness direction;

two electrode layers respectively installed on the first inner surface and the second inner surface;

an insulating elastomer sandwiched between the two electrode layers;

a bumper including:

a base body fixed to the second outer surface of the second sheet through a bottom side thereof; and a protruding body protruding from the base body, wherein a projection space defined by projecting the bumper toward the first sheet along the thickness direction covers at least part of the insulating elastomer; and a bonding layer located outside of the insulating elastomer and including a supporting body, a first bonding film connected to one side of the supporting body, and a second bonding film that is connected to another side of the supporting body, wherein the supporting body is connected to the first inner surface of the first sheet through the first bonding film, and the supporting body is connected to the second inner surface of the second sheet through the second bonding film;

wherein, when the force sensor receives an external force through the protruding body of the bumper, the second sheet is pressed by the base body to have an elastic deformation, so that the insulating elastomer is elastically deformed, and at least one of the first bonding film and the second bonding film is elastically deformed.

11. The force sensor according to claim 10, wherein the at least one of the first bonding film and the second bonding film has a hardness that meets a Shore A hardness of 0-100 and a Shore OOOS hardness of 0-100.

12. The force sensor according to claim 10, wherein the first sheet, the second sheet, and the bonding layer jointly define a deformable space that is not sealed and that is in spatial communication with an external space.

13. The force sensor according to claim 10, wherein the protruding body is connected to a center portion of the base body, and wherein a height of the protruding body along the thickness direction is greater than or equal to a thickness of the base body.

14. The force sensor according to claim 10, wherein, along a transverse direction perpendicular to the thickness direction, the bumper has a first outside diameter, and the protruding body has a second outside diameter that is within a range from 15% to 25% of the first outside diameter.

15. The force sensor according to claim 10, wherein the insulating elastomer includes:

an insulating layer disposed on one of the two electrode layers; and a plurality of pillars each having a first end and a second end that is opposite to the first end, wherein the first ends of the pillars are connected to the insulation layer, and the second ends of the pillars are connected to another one of the two electrode layers, and wherein the projection space covers an entirety of the pillars.

16. The force sensor according to claim 15, wherein, along a transverse direction perpendicular to the thickness direction, the bumper has a first outside diameter, and two of the pillars arranged away from each other have a largest distance therebetween that is within a range from 95% to 105% of the first outside diameter.

17. The force sensor according to claim 10, further comprising an adhesive layer disposed on the first outer surface and configured to adhere to an external object.

18. The force sensor according to claim 10, wherein the first sheet includes:

a first substrate having the first inner surface; and a first grounding layer disposed on the first substrate and having the first outer surface;

wherein a first projection region defined by projecting the two electrode layers and the insulating elastomer onto the first sheet along the thickness direction is entirely located on the first grounding layer.

19. The force sensor according to claim 18, wherein the second sheet includes:

a second substrate having the second inner surface; and a second grounding layer disposed on the second substrate and having the second outer surface, wherein the base body of the bumper is adhered to the second grounding layer;

wherein a second projection region defined by projecting the two electrode layers and the insulating elastomer onto the second sheet along the thickness direction is entirely located on the second grounding layer.

20. The force sensor according to claim 11, wherein the projection space covers at least 50% of a volume of the insulating elastomer.

* * * * *